(12) United States Patent
Godoy et al.

(10) Patent No.: US 11,734,210 B2
(45) Date of Patent: Aug. 22, 2023

(54) MULTIPURPOSE USB DONGLE APPARATUS FOR DATA TRANSFER

(71) Applicant: Lenovo (Singapore) Pte. Ltd., Singapore (SG)

(72) Inventors: Gustavo Labbate Godoy, Sumaré (BR); Carlos Eduardo Dias Duarte, Indaiatuba (BR); Denis Leite Gomes, Singapore (SG)

(73) Assignee: Lenovo (Singapore) Pte. Ltd., Singapore (SG)

( * ) Notice: Subject to any disclaimer, the term of this patent is extended or adjusted under 35 U.S.C. 154(b) by 32 days.

(21) Appl. No.: 17/201,870

(22) Filed: Mar. 15, 2021

(65) Prior Publication Data
US 2022/0292037 A1 Sep. 15, 2022

(51) Int. Cl.
| | |
|---|---|
| *G06F 13/00* | (2006.01) |
| *G06F 13/38* | (2006.01) |
| *G06F 9/4401* | (2018.01) |
| *G06F 8/65* | (2018.01) |
| *G06F 8/61* | (2018.01) |

(52) U.S. Cl.
CPC ............ *G06F 13/382* (2013.01); *G06F 8/63* (2013.01); *G06F 8/65* (2013.01); *G06F 9/4408* (2013.01); *G06F 2213/0042* (2013.01); *G06F 2213/3808* (2013.01)

(58) Field of Classification Search
CPC ........ G06F 13/382; G06F 8/65; G06F 9/4408; G06F 2213/0042; G06F 2213/3808
See application file for complete search history.

(56) References Cited

U.S. PATENT DOCUMENTS

| | | | |
|---|---|---|---|
| 2006/0041638 A1* | 2/2006 | Whittaker | H04L 67/75 709/219 |
| 2009/0153692 A1* | 6/2009 | Koide | H04N 23/631 348/222.1 |
| 2018/0004696 A1* | 1/2018 | Lee | G06F 13/4282 |
| 2019/0258832 A1* | 8/2019 | Jung | H02M 3/1582 |
| 2020/0073455 A1* | 3/2020 | Na | H04L 12/40045 |
| 2022/0131949 A1* | 4/2022 | Hamlin | G06F 15/16 |
| 2022/0147130 A1* | 5/2022 | Kim | G06F 1/3209 |

\* cited by examiner

*Primary Examiner* — Henry Tsai
*Assistant Examiner* — Kim T Huynh
(74) *Attorney, Agent, or Firm* — Schwegman Lundberg & Woessner, P.A.

(57) ABSTRACT

A computer booting apparatus includes a computer processor, a computer memory coupled to the computer processor, and a communication port coupled to the computer processor. The computer processor is configurable for operation in a host mode and a device mode. The host mode connects to an external computer processor and an external computer memory via the communication port, checks for a new image file or a revised image file stored in the external computer processor or the external computer memory, and loads the new image file or the revised image file into the computer memory. The device mode boots a device via the communication port using the new image file or the revised image file.

20 Claims, 5 Drawing Sheets

MULTIPURPOSE USB DONGLE APPARATUS FOR DATA TRANSFER

BACKGROUND

In a wide range of computer applications, there is the need to gather and/or transfer information either from or to a certain machine in order for the information to be stored in another form of storage (e.g., in a PC, a Cloud server, and/or memories such as a secure digital (SD) card, a hard drive, and/or a pen drive). This transfer process is often done by means of network transfer protocols within wide area networks (WAN) and local area networks (LAN). However, if a user is unable to connect the hardware with network media cables, it is then necessary to use some type of mass storage device to make the transfer process possible in a two-step manner. First, by transferring files to, for example, a universal serial bus (USB) mass storage device, and then secondly, dumping the files into the desired storage device. This two-step operation can be a tedious process and can even be prone to operator errors, especially if the end user has to manipulate such transfer between a great number of machines. For example, the user could end up forgetting to transfer data from the USB to a desired storage destination. Moreover, sometimes machines may not have WAN/LAN features, and user datagram protocol (UDP) file transfer can be slow under certain circumstances (e.g., example, when in unified extensible firmware interface (UEFI) boot mode).

Prior attempts to design devices that address this problem suffer from several shortcomings. Usually, the devices are unable to switch from a host mode to a device mode. SD cards are unable to boot machines, since the BIOS (basic input/output system) mode of the machine requires the device to be in a device mode and the SD cards operate in a host mode. Also, the SD cards can connect to Ethernet or WiFi to download images, but as noted, these SD cards cannot boot machines. Additionally, devices such as wireless USB sticks do not run algorithms; they only act as external storage for other devices. Also, a WIFI USB stick cannot be used to retrieve new images and update itself to boot machines.

SUMMARY

An apparatus includes a computer processor, a computer memory coupled to the computer processor, and a communication port coupled to the computer processor. The computer processor is configurable for operation in a host mode and a device mode. The host mode is operable to connect to an external computer processor and an external computer memory via the communication port, to check for a new image file or a revised image file stored in the external computer processor or the external computer memory, and to load the new image file or the revised image file into the computer memory of the apparatus. The device mode is operable to boot a processor-based device via the communication port using the new image file or the revised image file.

A process includes using an apparatus comprising a computer processor, a computer memory coupled to the computer processor, and a communication port coupled to the computer processor, the apparatus comprising a single unit or a single printed circuit board, for connecting to an external computer processor and an external computer memory via the communication port, checking for a new image file or a revised image file stored in the external computer processor or the external computer memory, and loading the new image file or the revised image file into the computer memory of the apparatus. The apparatus is then used for booting a processor-based device via the communication port using the new image file or the revised image file.

A computer system includes a processor, a memory coupled to the processor, and a communication port coupled to the processor. The processor is configurable for operation in a host mode and a device mode. The host mode is operable to connect to an external computer processor and an external computer memory via the communication port, to check for a new image file or a revised image file stored in the external computer processor or the external computer memory, and to load the new image file or the revised image file into the memory of the computer system. The device mode is operable to boot a device via the communication port using the new image file or the revised image file.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware-based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

One or more embodiments of the current disclosure address the above-discussed problems of transferring data in situations wherein there is no direct connection to a network, and executing such transfer without the use of removable storage media such as a uniform serial bus (USB) flash drive or external hard drives. More specifically, in an embodiment, a removable dongle apparatus acts as a USB storage medium with self-updating capability for booting an offline machine. The apparatus is removable from the machine that the apparatus is booting.

An embodiment of the dongle apparatus enables a switching capability between a host mode and a device mode. In the host mode, the dongle apparatus can intelligently, programmatically, and automatically connect to a server or other processor and/or storage device, check for new versions and updates of image files that the dongle apparatus has stored in its memory, verify the integrity of the new or updated image files, and receive those new and updated image files into the storage of the dongle apparatus. In the device mode, the dongle apparatus then boots a machine or other computer device using a selected new or updated image that was stored in the memory of the dongle apparatus. In the device mode, the dangle apparatus is basically acting as a bootable USB drive.

Figure 1:
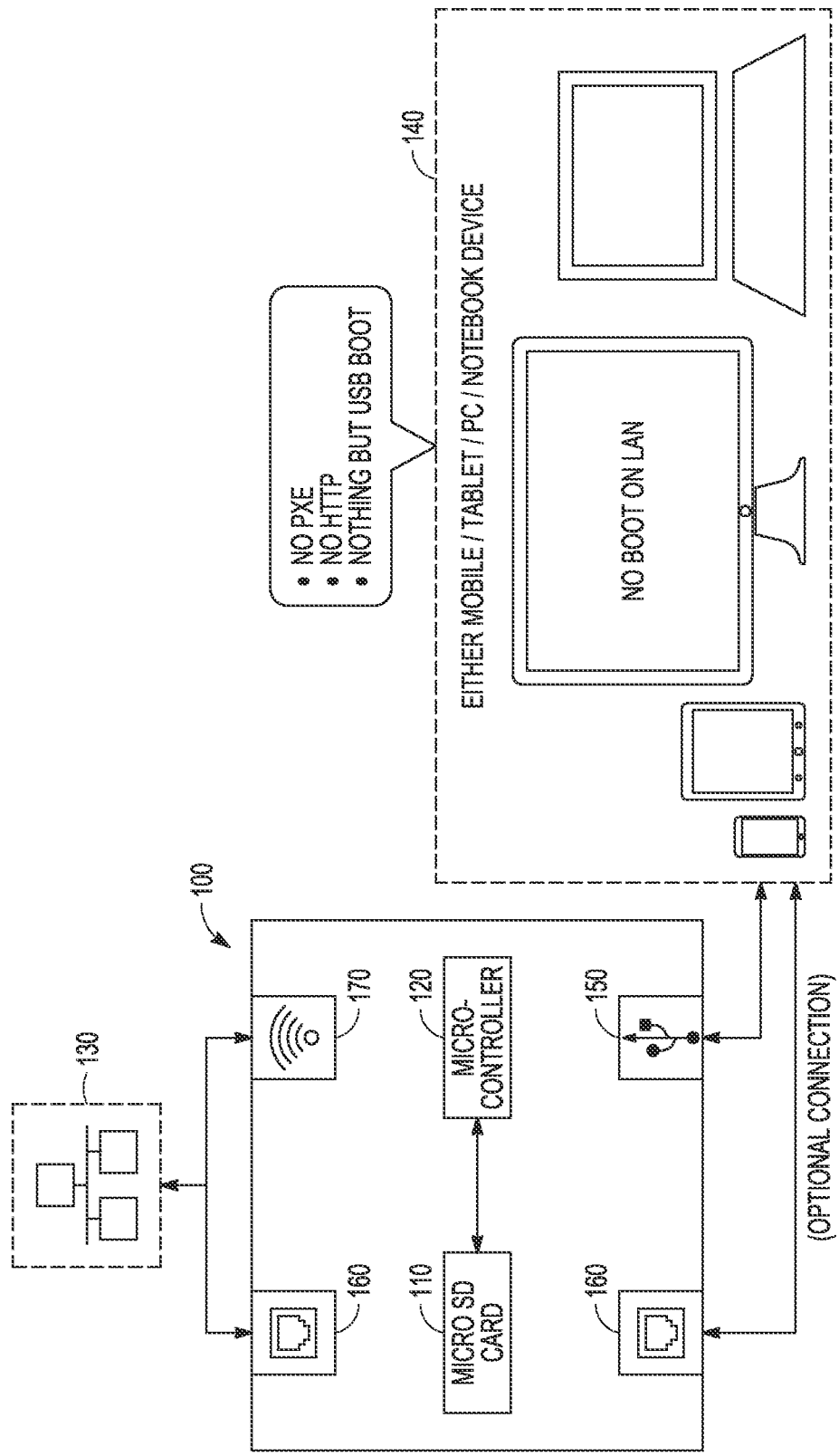
FIG. 1 is a block diagram of a dongle apparatus.

As illustrated in FIG. 1, a dangle apparatus 100 is a removable device that includes an automatic, self-updating function and a USB bootable image for a computer device. The dongle apparatus 100 can include an internal memory storage 110 such as a micro SD card, wherein image files are stored, updated, and loaded by a microcontroller unit 120. These image files can be copied in from a server 130 or other computer processor and/or storage device, and these images can be used for booting a machine 140 by USB communication port 150 or other communication protocol. The microcontroller unit 120 contained within the dongle apparatus 100 contains embedded software logic for managing the modes (host and device) of operation, retrieving image files from a server or other computer processor or storage device, updating existing image files in the storage 110 of the dongle apparatus 100, and using the updated image files to boot the machine 140 or other computer device via the USB port 150 in the dongle apparatus. The dongle apparatus can boot a machine using a USB cable when the machine does not have an Ethernet port and the USB-to-LAN adapter doesn't work on BOOT mode.

Additionally, the dongle apparatus illustrated in FIG. 1 includes one or more Ethernet ports 160 for establishing a local area network (LAN) communication with the server 130, and a wireless Internet (WiFi) card 170 for establishing wide area network (WAN) communication with the server 130 when such a communication link is necessary. The USB port 150, in addition to being used to boot the machine 140, can be used for handling data communication. Optionally, the dongle apparatus 140 can be coupled to an external memory in lieu of and/or in addition to the internal memory storage 110 of the dongle apparatus 100.

Figure 2:
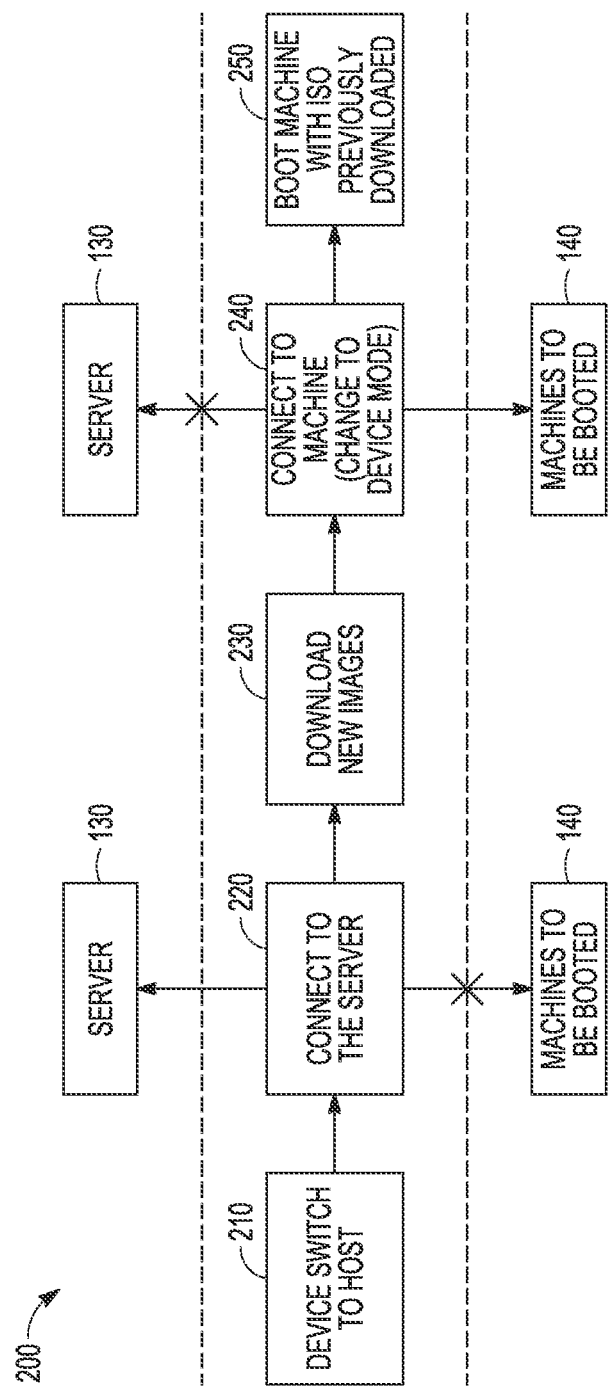
FIG. 2 is a high-level block diagram of a process to retrieve new and revised image files from a source and then use the image files to boot a machine.

In an embodiment, as illustrated in FIG. 2, the dongle apparatus can execute the following processes. A process 200 keeps the storage in the dongle apparatus updated through a host mode function 210. This host mode function can include one or more of the following operations. At 220, a communication is first established with the server 130 or other computer processor or storage device. As illustrated in FIG. 2, the dongle apparatus is not communicating with the machine 140 to be booted at this point of the operation. The dongle apparatus then checks the storage associated with the server for the most recent version of one or more image files. A most recent version of an image file from the server storage is compared with the version of that image file that is currently stored in the memory of the dongle apparatus. Any up-to-date image files are then fetched by the dongle apparatus at 230 by downloading these files from the server and storing these files in the internal memory of the dongle apparatus and/or in an external memory associated with the dongle apparatus. The dongle apparatus then checks the integrity of the fetched image files, and if the integrity check is passed, the corresponding files in the internal memory of the dongle apparatus are updated. The dongle apparatus then disconnects itself from the server, connects to the machine(s) to be booted at 240, and updates the pertinent files in the machine(s) at 250. This booting process at 250 can include establishing communication by the dongle apparatus with the machine 140 through a communication port such as a USB port. This booting of the machine can be a complete general or initial boot, it can be a re-boot, and/or it can be a boot directed to a specified purpose or function. The process coordinates the booting process, and further checks to see if the booting process was successful.

An embodiment, instead of loading a full operating system into the microcontroller of the dongle apparatus, which could make the image file transfer process slow, can use a lightweight Linux kernel. The Linux kernel permits the booting to be executed in a live mode. The responsibility then of the microcontroller is to store and manage fetched files from the server inside the internal (or external) memory card as well as to use those images (e.g., ISO (International Organization for Standardization) and EFI (extensible firmware interface) files) for booting.

Unlike a simple USB flash drive, an embodiment of the dongle apparatus does not have to be disconnected from the machine (to which the dongle apparatus transfers the new and revised files) to have the files in internal memory of the dongle apparatus updated. Also, unlike any USB storage device or a USB emulator, the dongle apparatus can fetch images from a server via the Internet by itself, and thereby update its files automatically. USB storage devices or corresponding emulators do not have the required embedded logic for connecting to a server, self-updating, the USB, and booting a machine. Additionally, unlike a network sharing device, the dongle apparatus is not intended to act as a network interface between the Internet and the offline machine just as, for example, an external USB LAN card. The dongle apparatus is therefore not a bridge with embedded software for enabling Internet access directly to the offline machine as a USB-to-LAN adapter would do. Moreover, unlike a network LAN adapter through which one might boot a machine over a LAN, the dongle apparatus boots the machine by means of a USB port while accessing the Internet for file fetching.

As noted, the dongle apparatus can connect to any two machines or devices for data transfer when either one of the machine or devices is not connected to a network. The dongle apparatus is normally contained within a single unit, but as noted can also include external memory. The microcontroller in the dongle apparatus can be, for example, a single board computer such as a Raspberry Pi or an Arduino-like processor. In host mode, the dongle apparatus allows the machine or device connected to it to control Internet access. One of the Ethernet ports can be used during the host mode when a cabled connection is desired for wired LAN communication. Otherwise, a Wi-Fi port can be used to establish a Wi-Fi connection for Internet access over a WAN. The microcontroller controls downloading/uploading functions through either the Ethernet or Wi-Fi ports.

In device mode, the dongle apparatus can function as a USB mass storage device. The microcontroller manages transferring files through USB communications between itself and the machine or device connected to it. The microcontroller also manages data storage. For storing purposes, a USB mass storage device or an SD card can be used as an internal mass storage medium (e.g., a MicroSD card).

Switching between the host mode and the device mode can be executed by an algorithm running on the microcontroller. The algorithm can first determine if the dongle apparatus is not in device mode (that is, being used to boot a machine) and can then connect to a server as a host and check for new images to download. The new images are downloaded to and made available on the dongle apparatus' storage (e.g., an SD card or external storage). From the point of view of the server, the apparatus is seen as a removable media device.

In device mode, the apparatus is recognized in the BIOS and is able to boot other machines, just like a USB stick does. Using a previously downloaded image, the device will boot the machine using the ISO as live mode. From the point of view of the (offline) machine, the dongle apparatus is seen as a bootable device.

The dongle apparatus is directly applicable to the area of hardware troubleshooting, and more specifically, to machine booting processes. Switching from host mode to device mode, and vice-versa, to boot with automatically updated images can save time in machine booting processes. For example, in an application of machine maintenance using hardware diagnostics, such diagnostics procedures would be considerably accelerated, especially if the diagnostics were run in a batch of machines and, even more, when their diagnostics images were updated. Also, offline machines can be booted with up-to-date image files that have been retrieved by the dongle apparatus. Using the dongle apparatus, a server can be indirectly accessed by an offline machine. The dongle apparatus further permits one to avoid plugging and unplugging USB drives when transferring files from an offline machine to a server.

The dongle apparatus is especially useful in the following specific instances. The machine (PC) does not have an Ethernet port or a USB2LAN option. The machine (PC) does not have an Ethernet port and a USB2LAN is incompatible as boot mode (BIOS does not recognize USB-to-LAN device to PXE boot). The PC has an Ethernet port, though it has become faulty or inoperable. The PC has as an Ethernet port, but nevertheless the PC owner does not wish to directly expose the PC to a network for some reason.

A related field of application for the dongle apparatus is BIOS flashing, including data recovery from a bootable USB or running temporary operating systems (e.g., Live USB) on offline machines. Additionally, the dongle apparatus can be used in applications where one does not want to, or is unable to, connect a machine to the network, but needs to gather (or read) data files from it using another PC without the need to repetitively plug and unplug a USB drive from one machine to another machine. The dongle apparatus can function as an intelligent mass storage device that avoids such repetitive processes like switching a USB drive back and forth from an offline machine to an online machine (e.g., a server).

Figure 3A:
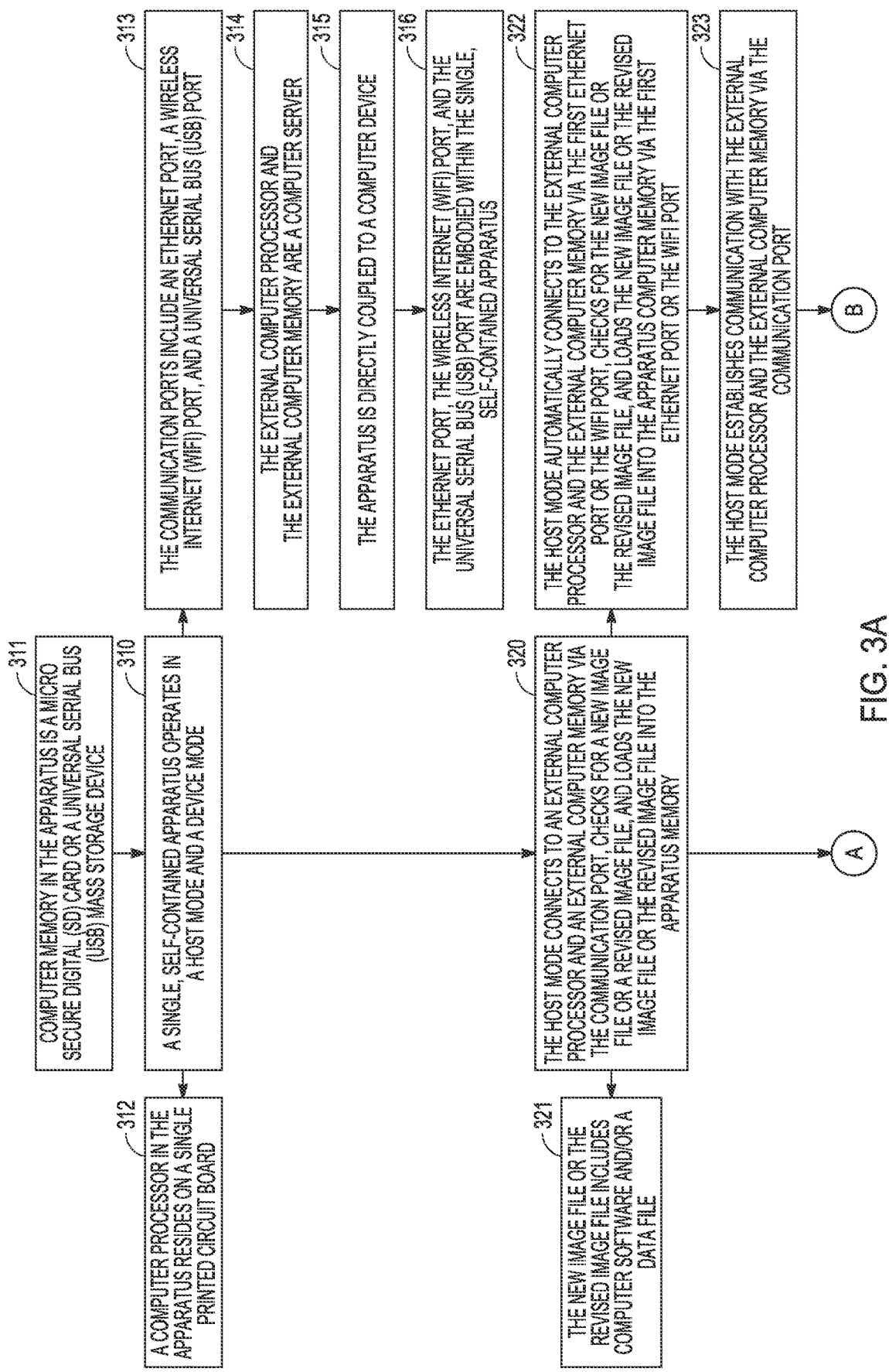
FIGS. 3A, 3B, and 3C are a more detailed block diagram of the process of FIG. 2.
Figure 3B:
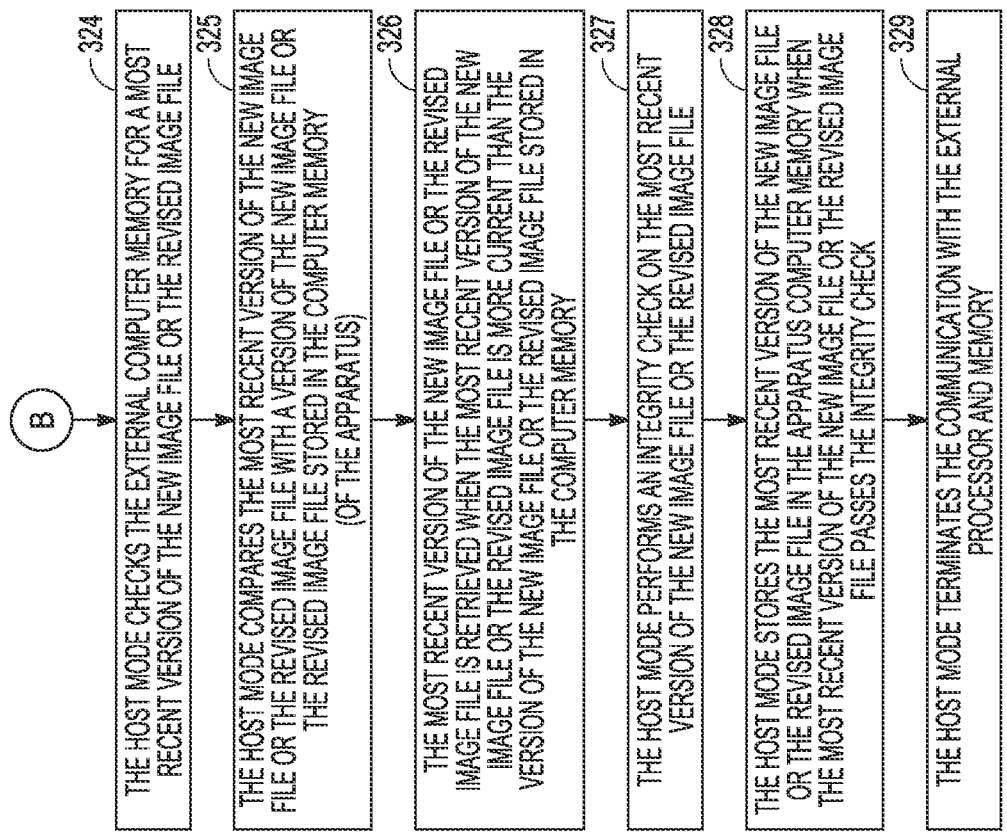
Figure 3C:
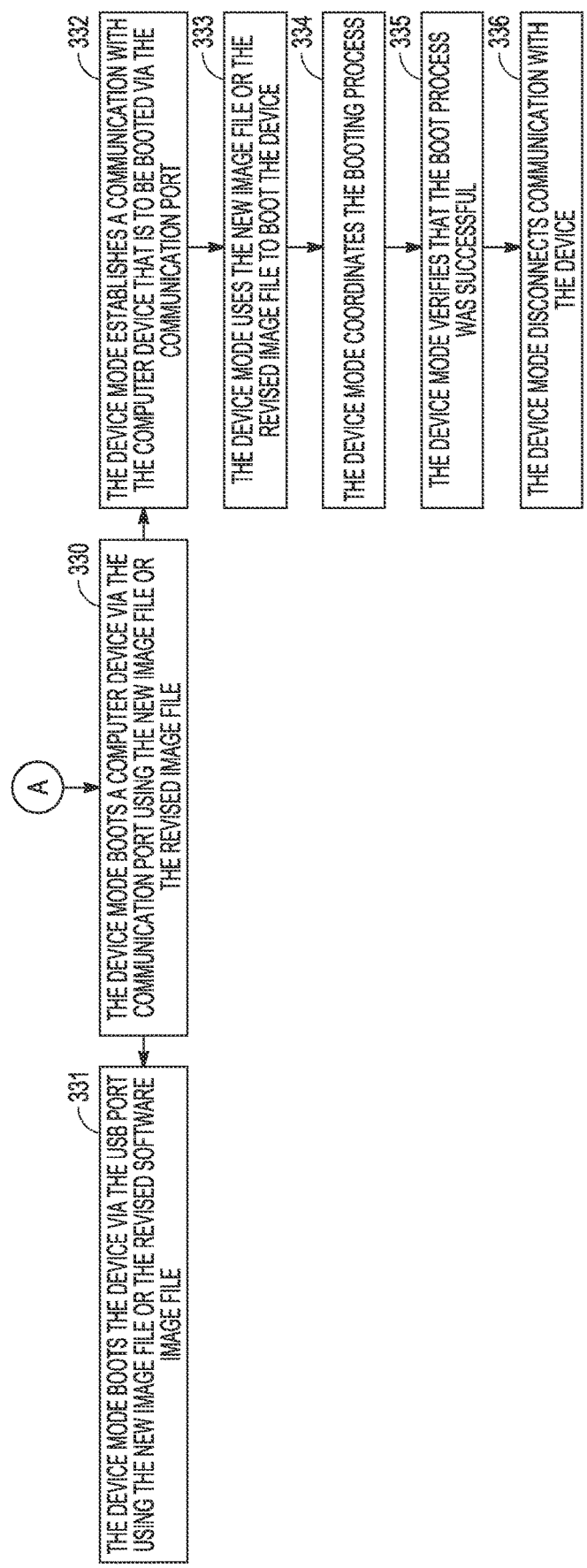

FIGS. 3A, 3B, and 3C illustrate operations and features of an embodiment of a dongle apparatus. FIGS. 3A, 3B, and 3C include operation or feature blocks 310-336. Though arranged substantially serially in the example of FIGS. 3A, 3B, and 3C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 3A, 3B, and 3C, in a single, self-contained apparatus, the apparatus having a processor, memory, and one or more communication ports, as indicated at 310, the computer processor is configurable for operation in a host mode and a device mode. In an embodiment, as indicated at 311, the computer memory in the apparatus is a micro secure digital (SD) card or a universal serial bus (USB) mass storage device. In another embodiment, the computer processor resides on a single printed circuit board (312).

The host mode is operable to connect to an external computer processor and an external computer memory (that is, external to the single, self-contained apparatus) via the communication port, to check for a new image file or a revised image file stored in the external computer processor or the external computer memory, and to load the new image file or the revised image file into the computer memory (320). As indicated at 321, the new image file or the revised image file can be computer software and/or a data file. The device mode is operable to boot a computer device via the communication port using the new image file or the revised image file (330). In a particular embodiment, for example at operation 331, the device mode is operable to boot the device via the USB port using the new image file or the revised software image file.

The communication ports can include one or more of an Ethernet port, a wireless Internet (WiFi) port, and a universal serial bus (USB) port (313), and the external computer processor and the external computer memory can be a computer server (314). As indicated at 315, the apparatus is directly coupled to the computer device (that is, the device to be booted). The Ethernet port, the wireless Internet (WiFi) port, and the universal serial bus (USB) port, since they are part and parcel of the communication ports, are also embodied within the single, self-contained apparatus (316).

As indicated at 322, the host mode of the apparatus is configurable to automatically connect to the external computer processor and the external computer memory via the first Ethernet port or the WiFi port, to check for the new image file or the revised image file stored in the external computer processor or the external computer memory, and to load the new image file or the revised image file into the computer memory via the Ethernet port or the WiFi port.

More specifically, the host mode can include the following operations. At 323, the host mode establishes communication with the external computer processor and the external computer memory via the communication port, and checks the external computer memory for a most recent version of the new image file or the revised image file (324). The host mode then at 325 compares the most recent version of the new image file or the revised image file with a version of the new image file or the revised image file stored in the computer memory (of the apparatus). At 326, the most recent version of the new image file or the revised image file is retrieved when the most recent version of the new image file or the revised image file is more current than the version of the new image file or the revised image file stored in the computer memory. The host mode then performs an integrity check on the most recent version of the new image file or the revised image file at 327, and stores the most recent version of the new image file or the revised image file in the computer memory when the most recent version of the new image file or the revised image file passes the integrity check (328). At 329, the host mode terminates the communication with the external processor and memory.

As indicated at 332, the device mode is operable for establishing a communication with the computer device that is to be booted via the communication port. After the establishment of the communication, the device mode at 333 uses the new image file or the revised image file to boot the device, and it coordinates the booting process at 334. After the coordination of the booting process, at 335, the device mode verifies that the boot process was successful. The device mode can accomplish this by verifying that the necessary programs and processes for a successful boot have started up. After the verification that the boot process was successful, the device mode at 336 disconnects the communication with the device.

EXAMPLES

Example 1 is an apparatus comprising a computer processor; a computer memory coupled to the computer processor; and a communication port coupled to the computer processor; wherein the computer processor is configurable for operation in a host mode and a device mode; wherein the host mode is operable to connect to an external computer processor and an external computer memory via the communication port, to check for a new image file or a revised image file stored in the external computer processor or the external computer memory, and to load the new image file or the revised image file into the computer memory; and wherein the device mode is operable to boot a device via the communication port using the new image file or the revised image file.

Example 2 includes all the features of Example 1, and optionally includes a first Ethernet port; a second Ethernet port; a wireless Internet (WiFi) port; and a universal serial bus (USB) port.

Example 3 includes all the features of Examples 1-2, and optionally includes the feature wherein the external computer processor and the external computer memory comprise a computer server.

Example 4 includes all the features of Examples 1-3, and optionally includes the features wherein the host mode is configurable to automatically connect to the external computer processor and the external computer memory via the first Ethernet port or the WiFi port, to check for the new image file or the revised image file stored in the external computer processor or the external computer memory, and to load the new image files or the revised image file into the computer memory via the first Ethernet port or the WiFi port.

Example 5 includes all the features of Examples 1-4, and optionally includes the feature wherein the new image file or the revised image file comprises software code or data.

Example 6 includes all the features of Examples 1-5, and optionally includes the feature wherein the device mode is operable to boot the device via the USB port using the new image file or the revised software image file.

Example 7 includes all the features of Examples 1-6, and optionally includes establishing a communication with the external computer processor and the external computer memory via the communication port; checking the external computer memory for a most recent version of the new image file or the revised image file; comparing the most recent version of the new image file or the revised image file with a version of the new image file or the revised image file stored in the computer memory; retrieving the most recent version of the new image file or the revised image file when the most recent version of the new image file or the revised image file is more current than the version of the new image file or the revised image file stored in the computer memory; performing an integrity check on the most recent version of the new image file or the revised image file; storing the most recent version of the new image file or the revised image file in the computer memory when the most recent version of the new image file or the revised image file passes the integrity check; and disconnecting the communication.

Example 8 includes all the features of Examples 1-7, and optionally includes establishing a communication with the device via the communication port; using the new image file or the revised image file to boot the device; coordinating the booting process; verifying that the booting process was successful; and disconnecting the communication with the device.

Example 9 includes all the features of Examples 1-8, and optionally includes the feature wherein the apparatus is directly coupled to the device.

Example 10 includes all the features of Examples 1-9, and optionally includes the feature wherein the computer memory comprises a micro secure digital (SD) card or a universal serial bus (USB) mass storage device.

Example 11 includes all the features of Examples 1-10, and optionally includes the feature wherein the computer processor, the computer memory, the first Ethernet port, the second Ethernet port, the wireless Internet (WiFi) port, and the universal serial bus (USB) port are embodied within a single unit.

Example 12 includes all the features of Examples 1-11, and optionally includes the feature wherein the computer processor resides on a single printed circuit board.

Example 13 is a process comprising using an apparatus comprising a computer processor, a computer memory coupled to the computer processor, and a communication port coupled to the computer processor, the apparatus comprising a single unit or a single printed circuit board, for connecting to an external computer processor and an external computer memory via the communication port, checking for a new image file or a revised image file stored in the external computer processor or the external computer memory, and loading the new image file or the revised image file into the computer memory; and booting a device via the communication port using the new image file or the revised image file.

Example 14 includes all the features of Example 13, and optionally includes automatically connecting to the external computer processor and the external computer memory via a first Ethernet port or a WiFi port; checking for the new image file or the revised image file stored in the external computer processor or the external computer memory; and loading the new image files or the revised image file into the computer memory via the first Ethernet port or the WiFi port.

Example 15 includes all the features of Examples 13-14, and optionally includes the feature of establishing a communication with the external computer processor and the external computer memory via the communication port; checking the external computer memory for a most recent version of the new image file or the revised image file; comparing the most recent version of the new image file or the revised image file with a version of the new image file or the revised image file stored in the computer memory; retrieving the most recent version of the new image file or the revised image file when the most recent version of the new image file or the revised image file is more current than the version of the new image file or the revised image file stored in the computer memory; performing an integrity check on the most recent version of the new image file or the revised image file; storing the most recent version of the new image file or the revised image file in the computer memory when the most recent version of the new image file or the revised image file passes the integrity check; and disconnecting the communication.

Example 16 includes all the features of Examples 13-15, and optionally includes the feature of establishing a communication with the device via the communication port; using the new image file or the revised image file to boot the device; coordinating the booting process; verifying that the booting process was successful; and disconnecting the communication with the device.

Example 17 is a system including a computer processor; a computer memory coupled to the computer processor; and a communication port coupled to the computer processor; wherein the computer processor is configurable for operation in a host mode and a device mode; wherein the host mode is operable to connect to an external computer processor and an external computer memory via the communication port, to check for a new image file or a revised image file stored in the external computer processor or the external computer memory, and to load the new image file or the revised image file into the computer memory; and wherein the device mode is operable to boot a device via the communication port using the new image file or the revised image file.

Example 18 includes all the features of Example 17, and optionally includes a first Ethernet port; a second Ethernet port; a wireless Internet (WiFi) port; and a universal serial bus (USB) port.

Example 19 includes all the features of Examples 17-18, and optionally includes establishing a communication with the external computer processor and the external computer memory via the communication port; checking the external computer memory for a most recent version of the new image file or the revised image file; comparing the most recent version of the new image file or the revised image file with a version of the new image file or the revised image file stored in the computer memory; retrieving the most recent version of the new image file or the revised image file when the most recent version of the new image file or the revised image file is more current than the version of the new image file or the revised image file stored in the computer memory; performing an integrity check on the most recent version of the new image file or the revised image file; storing the most recent version of the new image file or the revised image file in the computer memory when the most recent version of the new image file or the revised image file passes the integrity check; and disconnecting the communication.

Example 20 includes all the features of Examples 17-19, and optionally includes establishing a communication with the device via the communication port; using the new image file or the revised image file to boot the device; coordinating the booting process; verifying that the booting process was successful; and disconnecting the communication with the device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An apparatus comprising:
a computer processor;
a computer memory coupled to the computer processor; and
a communication port coupled to the computer processor;
wherein the computer processor is configurable for operation in a host mode and a device mode;
wherein the host mode is operable to connect to an external computer processor and an external computer memory via the communication port, to check for a new image file or a revised image file stored in the external computer processor or the external computer memory, and to load the new image file or the revised image file into the computer memory; and
wherein the device mode is operable to boot a device via the communication port using the new image file or the revised image file.

2. The apparatus of claim 1, wherein the communication port comprises one or more of:
an Ethernet port;
a wireless Internet (WiFi) port; and
a universal serial bus (USB) port.

3. The apparatus of claim 1, wherein the external computer processor and the external computer memory comprise a computer server.

4. The apparatus of claim 2, wherein the host mode is configurable to automatically connect to the external computer processor and the external computer memory via the Ethernet port or the WiFi port, to check for the new image file or the revised image file stored in the external computer processor or the external computer memory, and to load the new image file or the revised image file into the computer memory via the Ethernet port or the WiFi port.

5. The apparatus of claim 4, wherein the new image file or the revised image file comprises software code or data.

6. The apparatus of claim 2, wherein the device mode is operable to boot the device via the USB port using the new image file or the revised image file.

7. The apparatus of claim 1, wherein the host mode is operable for:
establishing a communication with the external computer processor and the external computer memory via the communication port;
checking the external computer memory for a most recent version of the new image file or the revised image file;
comparing the most recent version of the new image file or the revised image file with a version of the new image file or the revised image file stored in the computer memory;
retrieving the most recent, version of the new image file or the revised image file when the most recent version of the new image file or the revised image file is more current than the version of the new image file or the revised image file stored in the computer memory;
performing an integrity check on the most recent version of the new image file or the revised image file;
storing the most recent version of the new image file or the revised image file in the computer memory when the most recent version of the new image file or the revised image file passes the integrity check; and
disconnecting the communication.

8. The apparatus of claim 1, wherein the device mode is operable for:
establishing a communication with the device via the communication port;
using the new image file or the revised image file to boot the device;
coordinating the booting process;
verifying that the booting process was successful; and
disconnecting the communication with the device.

9. The apparatus of claim 1, wherein the apparatus is directly coupled to the device.

10. The apparatus of claim 1, wherein the computer memory comprises a micro secure digital (SD) card or a universal serial bus (USB) mass storage device.

11. The apparatus of claim 2, wherein the computer processor, the computer memory, the Ethernet port, the wireless Internet (WiFi) port, and the universal serial bus (USB) port are embodied within a single unit.

12. The apparatus of claim 1, wherein the computer processor resides on a single printed circuit board.

13. A process comprising:
using an apparatus comprising a computer processor, a computer memory coupled to the computer processor, and a communication port coupled to the computer processor, the apparatus comprising a single unit or a single printed circuit board, for:
connecting to an external computer processor and an external computer memory via the communication port, checking for a new image file or a revised image file stored in the external computer processor or the external computer memory, and loading the new image file or the revised image file into the computer memory; and
booting a device via the communication port using the new image file or the revised image file.

14. The process of claim 13, comprising:
automatically connecting to the external computer processor and the external computer memory via an Ethernet port or a WiFi port;
checking for the new image file or the revised image file stored in the external computer processor or the external computer memory; and
loading the new image files or the revised image file into the computer memory via the Ethernet port or the WiFi port.

15. The process of claim 13, comprising:
establishing a communication with the external computer processor and the external computer memory via the communication port;
checking the external computer memory for a most recent version of the new image file or the revised image file;
comparing the most recent version of the new image file or the revised image file with a version of the new image file or the revised image file stored in the computer memory;
retrieving the most recent version of the new image file or the revised image file when the most recent version of the new image file or the revised image file is more current than the version of the new image file or the revised image file stored in the computer memory;
performing an integrity check on the most recent version of the new image file or the revised image file;
storing the most recent version of the new image file or the revised image file in the computer memory when the most recent version of the new image file or the revised image file passes the integrity check; and
disconnecting the communication.

16. The process of claim 13, comprising:
establishing a communication with the device via the communication port;
using the new image file or the revised image file to boot the device;
coordinating the booting process;
verifying that the booting process was successful; and
disconnecting the communication with the device.

17. A system comprising:
a computer processor;
a computer memory coupled to the computer processor; and
a communication port coupled to the computer processor;
wherein the computer processor is configurable for operation in a host mode and a device mode;
wherein the host mode is operable to connect to an external computer processor and an external computer memory via the communication port, to check for a new image file or a revised image file stored in the external computer processor or the external computer memory, and to load the new image file or the revised image file into the computer memory; and
wherein the device mode is operable to boot a device via the communication port using the new image file or the revised image file.

18. The system of claim 17, wherein the communication port comprises one or more of:
an Ethernet port;
a wireless Internet (WiFi) port; and
a universal serial bus (USB) port.

19. The system of claim 17, wherein the computer processor is operable for:
establishing a communication with the external computer processor and the external computer memory via the communication port;
checking the external computer memory for a most recent version of the new image file or the revised image file;
comparing the most recent version of the new image file or the revised image file with a version of the new image file or the revised image file stored in the computer memory;
retrieving the most recent version of the new image file or the revised image file when the most recent version of the new image file or the revised image file is more current than the version of the new image file or the revised image file stored in the computer memory;
performing an integrity check on the most recent version of the new image file or the revised image file;
storing the most recent version of the new image file or the revised image file in the computer memory when the most recent version of the new image file or the revised image file passes the integrity check; and
disconnecting the communication.

20. The system of claim 17, wherein the computer processor is operable for:
establishing a communication with the device via the communication port;
using the new image file or the revised image file to boot the device;
coordinating the booting process;
verifying that the booting process was successful; and
disconnecting the communication with the device.

* * * * *